(12) United States Patent
Chen et al.

(10) Patent No.: US 8,462,838 B2
(45) Date of Patent: Jun. 11, 2013

(54) PROGRAMMABLE SFP OR SFP+ MODULE

(75) Inventors: Qinghua Chen, Saratoga, CA (US);
Maurilio De Nicolo, Saratoga, CA (US);
Stephen Ong, Fremont, CA (US);
Richard Brooks, Palo Alto, CA (US);
Liming Yin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 12/631,271

(22) Filed: Dec. 4, 2009

(65) Prior Publication Data

US 2011/0134988 A1 Jun. 9, 2011

(51) Int. Cl.
*H03K 5/159* (2006.01)
(52) U.S. Cl.
USPC ............................................ 375/229; 375/219
(58) Field of Classification Search
USPC .................. 375/229, 219; 398/138, 139, 142, 398/660; 439/607.55; 714/704, 752
See application file for complete search history.

(56) References Cited

U.S. PATENT DOCUMENTS

| | | | | |
|---|---|---|---|---|
| 5,835,531 | A | * 11/1998 | Hirayama | ...................... 375/229 |
| 8,075,199 | B2 | * 12/2011 | Losio et al. | ...................... 385/92 |
| 2007/0104490 | A1 | * 5/2007 | Ghiasi | ........................... 398/159 |

OTHER PUBLICATIONS

SFP+ Loopback Adapter, Rev Mar. 1, 2007, 20 pages.
SFP+ Evaluation Board, (Jan. 2008), 19 pages.

* cited by examiner

*Primary Examiner* — Khai Tran

(57) ABSTRACT

Various example embodiments are disclosed. According to one example embodiment, a small form factor pluggable (SFP or SFP+) module may include an equalizer and a logic controller. The equalizer may be configured to receive data, provide signal information to a logic controller based on the received data, equalize the data based on equalization instructions received from the logic controller, and transmit the equalized data. The logic controller may be configured to transmit the signal information received from the equalizer receive programming instructions provide the equalization instructions to the equalizer based on the programming instructions, receive control inputs associated with the data, and provide status outputs based on the control inputs and the programming instructions. The SFP or SFP+ module may be configured to plug into a small form factor (SFF) host connector.

23 Claims, 2 Drawing Sheets

PROGRAMMABLE SFP OR SFP+ MODULE

TECHNICAL FIELD

This description relates to computer network testing.

BACKGROUND

During computer networking equipment design, manufacturing testing, or troubleshooting phases, network interfaces, such as Fiber Channel or Ethernet interfaces, may be tested or diagnosed with transmitter/receiver interfaces, such as transmitter/receiver interfaces looped back to each other.

DESCRIPTION OF EXAMPLE EMBODIMENTS

Overview

According to one general aspect, a small form factor (SFP or SFP+) module may include an equalizer and a logic controller. The equalizer may be configured to receive data, provide signal information to a logic controller based on the received data, equalize the data based on equalization instructions received from the controller, and transmit the equalized data. The logic controller may be configured to transmit the signal information received from the equalizer, receive programming instructions, provide the equalization instructions to the equalizer based on the programming instructions, receive control inputs associated with the data, and provide status outputs based on the control inputs and the programming instructions. The SFP or SFP+ module may be configured to plug into a small form factor (SFF) host connector.

According to another general aspect, a method may include receiving programming instructions, receiving data, equalizing the data based on the programming instructions, receiving control inputs, and providing status outputs based on the control inputs and the programming instructions.

According to another general aspect, a small form factor (SFP or SFP+) module may include means for receiving data, providing signal information based on the received data, equalizing the data based on equalization instructions, and transmitting the equalized data. The SFP or SFP+ module may also include means for transmitting the signal information received from the equalizer, receiving programming instructions, providing the equalization instructions based on the programming instructions, receiving control inputs associated with the data, and providing status outputs based on the control inputs and the programming instructions. The SFP or SFP+ module may also include means for plugging into a small form factor (SFF) host connector.

The details of one or more implementations are set forth in the accompanying drawings and the description below. Other features will be apparent from the description and drawings, and from the claims.

Description

Figure 1:
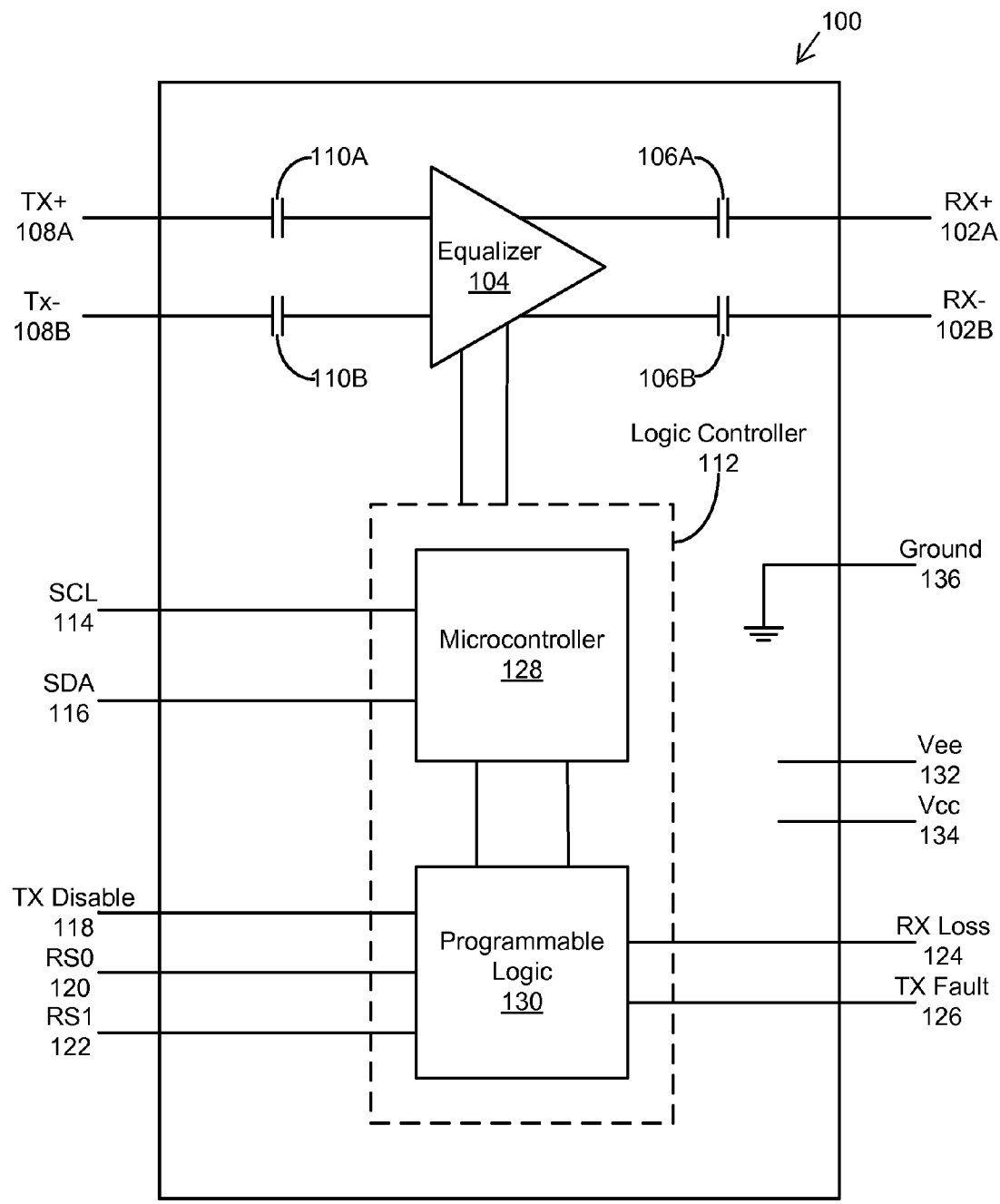
FIG. 1 is a block diagram of small form factor pluggable (SFP or SFP+) module according to an example embodiment.

FIG. 1 is a block diagram of small form factor pluggable (SFP or SFP+) module 100 according to an example embodiment. The SFP or SFP+ module 100 may, for example, serve as a loop back module by receiving data and sending the data back for testing, diagnostic, and/or troubleshooting. The SFP or SFP+ module 100 may, for example, plug into a small form factor (SFF) host connector and/or an SFP or SFP+evaluation board. The SFP or SFP+ module 100 may include a housing configured to plug into the SFF host connector or evaluation board, and/or may include electrical pins and/or optical pins which couple with the SFF host connector or evaluation board.

The SFP or SFP+ module 100 may be configured to transmit and receive data to and from the SFF host connector or evaluation board according to a Serial Gigabit Media Independent Interface (SGMII) or a Serializer-deserializer Framer Interface (SFI) protocol. The SFP or SFP+ module 100 may, for example, include an edge card connector configured to plug into the SFF host connector or evaluation board and create an electrical coupling between the SFP or SFP+ module 100 and the SFF host connector or evaluation board. The SFP or SFP+ module 100 may also include a fiber optic cable which carries data according to an SFP or SFP+ optical protocol.

In the example shown in FIG. 1, the SFP or SFP+ module 100 may include one or more input nodes 102A, 102B. The input nodes 102A, 102B may, for example, include differential electrical signaling nodes. The electrical signals received by the input nodes 102A, 102B may have been converted into electrical signals from fiber optical signals. The communication protocol for the fiber optical signals may, for example, include the SFI communication protocol if the SFP or SFP+ module 100 includes an SFP+ module, and may include the SGMII communication protocol if the SFP or SFP+module 100 includes an SFP module, according to example embodiments. A user or operator of the SFP or SFP+ module 100 may desire to determine characteristics of the signal received by the input nodes 102A, 102B, such as signal-to-noise ratio or distortion, as non-limiting examples.

The data received by the input nodes 102A, 102B may be received by an equalizer 104. The SFP or SFP+ module 100 may include one or more capacitors 106A, 106B which stabilize fluctuations in the data as the data pass from the input nodes 102A, 102B to the equalizer 104. The equalizer 104 may perform equalization and/or preemphasis functions on the data based on equalization instructions received from a logic controller (the logic controller is described below). The equalizer 104 may, based on the equalization instructions, modify equalization coefficients to compensate for loss or dispersion in the data, or boost certain components (such as high frequency components) of the data, according to example embodiments. These equalization functions may, for example, be based on data rates, data loss rates, channel quality, dispersion, or distortion of the data.

The equalizer 104 may also serve as a serializer-deserializer. The equalizer 104 may convert the data between serial and parallel communication protocols. The equalizer 104 may, for example, convert the data from a parallel protocol to a serial protocol, or from a serial protocol to a parallel protocol.

The equalizer 104 may transmit the data out of one or more transmit nodes 108A, 108B, which may include differential transmit nodes. The equalizer 104 may transmit the data out of the transmit nodes 108A, 108B via one or more capacitors 110A, 110B; the capacitors 110A, 110B may stabilize fluctuations in the data and/or remove unwanted frequency components from the data. If the SFP or SFP+ module 100 is used as a loop back module, the data transmitted out of the transmit nodes 108A, 108B may be received by a testing module, such as the evaluation board, for diagnostic purposes.

The equalizer 104 may also provide signal information to the logic controller. The signal information may include data rates, frequency spectrum information, channel quality information, error rates, or data amplitude information, as non-limiting examples.

The SFP or SFP+ module 100 may also include a logic controller 112. The logic controller 112 may provide the equalization instructions to the equalizer 104. In the example shown in FIG. 1, the logic controller 112 may be coupled to the equalizer by two lines. Each of the lines may be unidirectional, with communication from the equalizer 104 to the logic controller 112 on a first line and from the logic controller 112 to the equalizer 104 on a second line.

The logic controller 112 may receive a clock signal from a serial clock line (SCL) 114. The logic controller 112 may receive the clock signal from the SCL 114 via, for example, an inter-integrated circuit (e.g., I2C) control path. The clock signal may be provided by the SFF host connector or evaluation board into which the SFP or SFP+module is plugged. The clock signals may be used to synchronize data transfers to and from the logic controller 112.

The logic controller 112 may receive the signal information from the equalizer 104. The logic controller 112 may provide the signal information to the SFF host connector or evaluation board via a data line (SDA) 116. The SFP or SFP+ module 100 may, for example, communicate with the SFF host connector or evaluation board via the SDA 116 according to a half-duplex communication protocol. According to the half-duplex communication protocol, at any given time, the logic controller 112 may read from the SFF host connector or evaluation board, or the logic controller 112 may write to the SFF host connector or evaluation board, but data, instructions, or requests may not travel in both directions along the SDA 116.

An operator may provide programming instructions to the logic controller 112. The operator may, for example, provide the programming instructions to the logic controller 112 based on the signal information, and/or based on other devices or networking conditions that the operator knows about or desires to learn about. The programming instructions may include the equalization instructions described above, and/or may include encoding or decoding instructions for providing status outputs based on control inputs, described below.

The logic controller 112 may, for example, receive control inputs such as a transmit disable 118, receive rate select (RS0) 120, and/or transmit rate select (RS1) 122 signals from the host connector or evaluation board. The logic controller 112 may encode the control inputs into status outputs, such as a receive loss (RX loss) 124 output and/or a transmit fault (RX fault) 126 output. The logic controller 112 may encode the control inputs into the status outputs based on the programming instructions. An operator may program the SFP or SFP+ module 100 and/or the logic controller 112 to provide any desired status output signals 124, 126 based on the control input signals 118, 120, 122 and/or based on the signal information received from the equalizer 104. The operator may thereby program the SFP or SFP+ module to provide status indications of any desired combination of control inputs. Thus, while the status outputs are labeled receive loss 124 and transmit fault 126 in the example shown in FIG. 1, the interpretation of these outputs may depend on the encoding instructions provided to the logic controller 112 based on the programming instructions.

While described above as a single component, the logic controller 112 may include or be divided into a microcontroller 128 and a programmable logic 130. The microcontroller 128 may receive the clock signal via the clock line 114. The microcontroller 128 may receive the signal information from the equalizer and transmit the signal information to the evaluation board via the data line 116. The microcontroller 128 may also receive the programming instructions from the host connector or evaluation board via the data line 116, and may provide the equalization instructions to the equalizer 104 based on the programming instructions. The microcontroller 128 may also provide the encoding instructions to the programmable logic 130 based on the programming instructions. The microcontroller 128 may receive status and/or control information from the programmable logic 130 based on the control inputs 118, 120, 122, and may provide the status and/or control information to the evaluation board via the data line 116.

The programmable logic 130 may receive the encoding instructions from the microcontroller 128. The programmable logic 130 may receive the control inputs 118, 120, 122, and may provide the status outputs 124, 126 based on the control inputs 118, 120, 122 and the encoding instructions. The programmable logic 130 may provide control and/or status information to the microcontroller 128 based on the control inputs 118, 120, 122.

The SFP or SFP+ module 100 may also include power inputs. The SFP or SFP+ module may, for example, include differential power inputs such as Vee 132 and Vcc 134. The SFP or SFP+ module 100 may also include a connection to ground 136.

Figure 2:
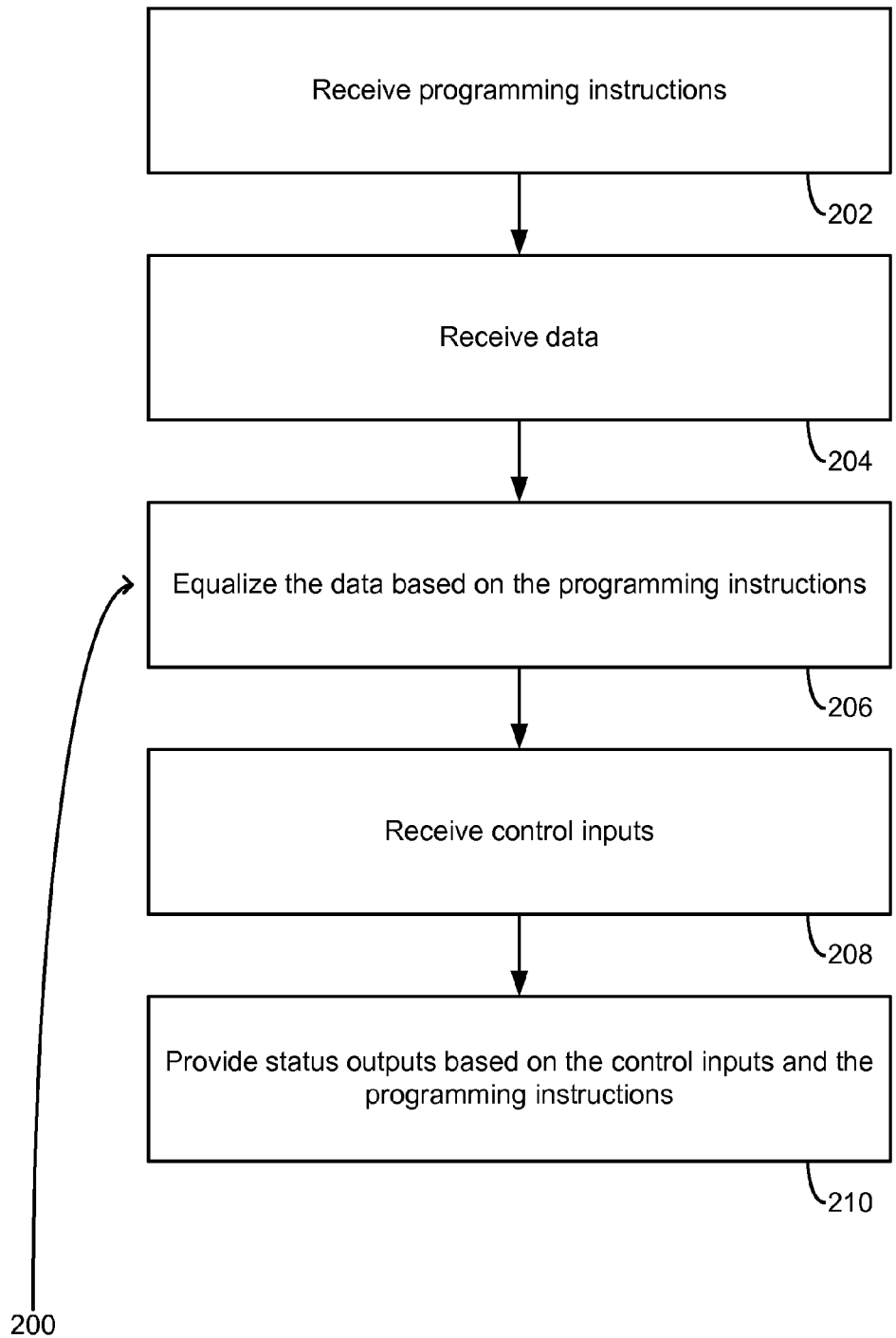
FIG. 2 is a flowchart of a method according to an example embodiment.

FIG. 2 is a flowchart of a method 200 according to an example embodiment. According to this example, the method 200 may include receiving, by an SFP or SFP+ module, programming instructions (202). The method 200 may also include receiving data according to an SFI or SGMII communications protocol (204). The method 200 may also include equalizing the data based on the programming instructions (206). The method 200 may also include receiving control inputs (208). The method 200 may also include providing status outputs based on the control inputs and the programming instructions (210).

According to an example embodiment, the control inputs may include a transmit disable input.

According to an example embodiment, the control inputs may include a receive rate select input and a transmit rate select input.

According to an example embodiment, the method 200 may further include transmitting the equalized data.

According to an example embodiment, the receiving the data may include receiving the data according to a Serial Gigabit Media Independent Interface (SGMII) or a Serializer-deserializer Framer Interface (SFI) protocol.

According to an example embodiment, the method 200 may further include plugging the SFP or SFP+ module into a small form factor (SFF) host connector.

According to an example embodiment, the method 200 may further include converting the data between parallel and serial communication protocols.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A small form factor pluggable (SFP or SFP+) module comprising:
    an equalizer configured to:
        receive data;
        provide signal information to a logic controller based on the received data;
        equalize the data based on equalization instructions received from the logic controller; and
        transmit the equalized data;
    the logic controller configured to:
        transmit the signal information received from the equalizer;
        receive programming instructions output from a host connector or an evaluation board;
        provide the equalization instructions to the equalizer based on the programming instructions;
        receive control inputs associated with the data; and
        provide status outputs based on the control inputs and the programming instructions;
    wherein the SFP or SFP+ module is configured to plug into a small form factor (SFF) host connector.

2. The SFP or SFP+ module of claim 1, wherein the equalizer is configured to receive the data according to a Serial Gigabit Media Independent Interface (SGMII) or a Serializer-deserializer Framer Interface (SFI) protocol.

3. The SFP or SFP+ module of claim 1, wherein the logic controller includes:
    a microcontroller configured to:
        transmit the signal information received from the equalizer;
        receive the programming instructions;
        provide the equalization instructions to the equalizer based on the programming instructions; and
        provide decoding instructions to a decoder based on the programming instructions; and
    the decoder configured to:
        receive the control inputs; and
        provide the status outputs based on the control inputs and the decoding instructions.

4. The SFP or SFP+ module of claim 1, further comprising:
    differential receiving nodes configured to receive the data from outside the SFP or SFP+ module; and
    differential transmitting nodes configured to transmit the data outside the SFP or SFP+ module.

5. The SFP or SFP+ module of claim 1, further comprising a housing enclosing the equalizer and the logic controller, the housing being configured to plug into the SFF host connector.

6. The SFP or SFP+ module of claim 1, further comprising a differential power input configured to receive power from the SFF host connector and provide the power to the equalizer and the logic controller.

7. The SFP or SFP+ module of claim 1, wherein the equalizer includes a serializer-deserializer configured to convert the data between parallel and serial communication protocols, and wherein the programming instructions include at least one of an encoding or a decoding instruction.

8. A small form factor pluggable SFP or SFP+ module, comprising:
    an equalizer configured to:
        receive data;
        provide signal information to a logic controller based on the received data;
        equalize the data based on equalization instructions received from the logic controller; and
        transmit the equalized data;

the logic controller configured to:
transmit the signal information received from the equalizer;
receive programming instructions;
provide the equalization instructions to the equalizer based on the programming instructions;
receive control inputs associated with the data; and
provide status outputs based on the control inputs and the programming instructions;
wherein:
the SFP or SFP+ module is configured to plug into a small form factor (SFF) host connector;
the control inputs include a transmit disable input; and
the logic controller is configured to instruct the equalizer to stop transmitting the data based on a signal received via the transmit disable input.

9. A small form factor pluggable SFP or SFP+ module, comprising:
an equalizer configured to:
receive data;
provide signal information to a logic controller based on the received data;
equalize the data based on equalization instructions received from the logic controller; and
transmit the equalized data;
the logic controller configured to:
transmit the signal information received from the equalizer;
receive programming instructions;
provide the equalization instructions to the equalizer based on the programming instructions;
receive control inputs associated with the data; and
provide status outputs based on the control inputs and the programming instructions; and
a clock input coupled to the logic controller,
wherein the SFP or SFP+ module is configured to plug into a small form factor (SFF) host connector.

10. A method comprising:
receiving, by an SFP or SFP+ logic controller module that includes a microcontroller, programming instructions output from a host connector or an evaluation board;
receiving data according to an SFI or SGMII communications protocol;
equalizing the data based on the programming instructions;
receiving control inputs; and
providing status outputs based on the control inputs and the programming instructions.

11. The method of claim 10, wherein the control inputs include a transmit disable input.

12. The method of claim 10, wherein the control inputs include a receive rate select input and a transmit rate select input.

13. The method of claim 10, wherein the programming instructions include at least one of an encoding or a decoding instruction.

14. The method of claim 10, wherein the receiving the data includes receiving the data according to a Serial Gigabit Media Independent Interface (SGMII) or a Serializer-deserializer Framer Interface (SFI) protocol.

15. The method of claim 10, further comprising plugging the SFP or SFP+ logic controller module into a small form factor (SFF) host connector.

16. The method of claim 10, further comprising converting the data between parallel and serial communication protocols.

17. The method of claim 11, further comprising:
transmitting the equalized data,
wherein the SFP or SFP+ logic controller module is configured to cause the equalized data to stop being transmitted based on a signal received via the transmit disable input.

18. The method of claim 10, further comprising:
coupling a clock input to the SFP or SFP+ logic controller module.

19. A small form factor pluggable (SFP or SFP+) module comprising:
means for:
receiving data;
providing signal information based on the received data;
equalizing the data based on equalization instructions; and
transmitting the equalized data;
means for:
transmitting the signal information;
receiving programming instructions output from a host connector or an evaluation board;
providing the equalization instructions based on the programming instructions;
receiving control inputs associated with the data; and
providing status outputs based on the control inputs and the programming instructions; and
means for plugging into a small form factor (SFF) host connector.

20. The SFP or SFP+ module of claim 19, wherein the means for receiving data include means for receiving the data according to a Serial Gigabit Media Independent Interface (SGMII) or a Serializer-deserializer Framer Interface (SFI) protocol.

21. The SFP or SFP+ module of claim 19, wherein the programming instructions include at least one of an encoding or a decoding instruction.

22. The SFP or SFP+ module of claim 19, wherein the means for providing signal information comprises:
means for providing signal information to a logic controller based on the received data,
wherein a clock input is coupled to the logic controller.

23. A small form factor pluggable SFP or SFP+ module comprising:
means for:
receiving data;
providing signal information based on the received data;
equalizing the data based on equalization instructions; and
transmitting the equalized data;
means for:
transmitting the signal information;
receiving programming instructions;
providing the equalization instructions based on the programming instructions;
receiving control inputs associated with the data; and
providing status outputs based on the control inputs and the programming instructions;
means for plugging into a small form factor (SFF) host connector;
means for transmitting the data; and
means for ceasing transmission of the data based on receiving one of the control inputs, the one of the control inputs including a transmit disable input.

* * * * *